United States Patent
Aguilar et al.

(10) Patent No.: US 8,957,783 B2
(45) Date of Patent: Feb. 17, 2015

(54) REMOTE SURVEILLANCE SYSTEM

(71) Applicant: Bounce Imaging, Inc., Boston, MA (US)

(72) Inventors: Francisco Aguilar, Dickerson, MD (US); Pablo Alvarado-Moya, Cartago (CR); Mikhail Fridberg, Sharon, MA (US)

(73) Assignee: Bounce Imaging, Inc., Boston, MA (US)

( * ) Notice: Subject to any disclaimer, the term of this patent is extended or adjusted under 35 U.S.C. 154(b) by 185 days.

(21) Appl. No.: 13/801,627

(22) Filed: Mar. 13, 2013

(65) Prior Publication Data
US 2014/0266773 A1    Sep. 18, 2014

Related U.S. Application Data

(60) Provisional application No. 61/717,130, filed on Oct. 23, 2012.

(51) Int. Cl.
*G08C 19/16* (2006.01)
*G08C 17/02* (2006.01)
(Continued)

(52) U.S. Cl.
CPC ................................. *G08C 17/02* (2013.01)
USPC .................. 340/870.01; 348/222.1; 348/143; 705/43; 600/300; 382/103; 726/4

(58) Field of Classification Search
CPC ....... G08C 17/02; G08C 19/00; A61B 5/0002
USPC ........... 340/870.01; 348/222.1, 143; 600/300; 382/103; 426/4
See application file for complete search history.

(56) References Cited

U.S. PATENT DOCUMENTS 6,978,051 B2   12/2005  Edwards
7,325,495 B1    2/2008  Giandomenico et al.
(Continued)

FOREIGN PATENT DOCUMENTS

GB       2 407 725 A      5/2005

OTHER PUBLICATIONS

Bray, Hiawatha, "Camera-ball helps keep emergency responders safe", The Boston Globe, Jan. 21, 2013, 4 pages, http://www.bostonglobe.com/business/2013/01/21/surveillance-cam.
http://dplsurve.buzznet.com/photos/default/?id=52053281, printed on Mar. 22, 2013, 7 pages.
http://theletter.co.uk/index/1714/bouncing+ball+camera, printed on Mar. 22, 2013, 4 pages.

(Continued)

*Primary Examiner* — Jack K Wang
(74) *Attorney, Agent, or Firm* — Greenberg Traurig, LLP; Chinh H. Pham; Todd C. Basile

(57) ABSTRACT

A method is provided for a system including a plurality of remote sensor apparatus and a portable receiver. The portable receiver includes an RFID reader. The remote sensor apparatus has an RFID unit. The method includes reading RFID stored in the RFID unit of one or more of the plurality of remote sensor apparatus using the RFID reader. The method also includes registering the one or more of the plurality of remote sensor apparatus using the received RFID. The method further includes receiving data from a first active remote sensor apparatus. The data includes sensor data collected from sensors installed in the first active remote sensor and RFID of the first active remote sensor apparatus. The method also includes processing the sensor data, if the RFID of the first active remote sensor apparatus matches the RFID of any of the one or more of the plurality of remote sensor apparatus.

9 Claims, 15 Drawing Sheets

(51) Int. Cl.
*H04N 5/228* (2006.01)
*H04N 7/18* (2006.01)
*G06Q 40/00* (2012.01)
*A61B 5/00* (2006.01)
*G06K 9/00* (2006.01)
*G06F 7/04* (2006.01)

(56) References Cited

U.S. PATENT DOCUMENTS

| | | | |
|---|---|---|---|
| 7,643,052 B2 | 1/2010 | Gal et al. | |
| 7,733,416 B2 | 6/2010 | Gal | |
| 2005/0024493 A1 | 2/2005 | Nam | |
| 2007/0171042 A1 | 7/2007 | Metes et al. | |
| 2009/0066804 A1 | 3/2009 | Kurokawa | |
| 2010/0066851 A1 | 3/2010 | Pooley et al. | |
| 2010/0277617 A1 | 11/2010 | Hollinger | |
| 2011/0128347 A1 | 6/2011 | Theobald | |
| 2011/0128349 A1 | 6/2011 | Theobald | |
| 2011/0164137 A1 | 7/2011 | Schwartz et al. | |
| 2012/0313791 A1* | 12/2012 | Mehta | 340/870.01 |
| 2014/0075514 A1* | 3/2014 | Prasad et al. | 726/4 |
| 2014/0135588 A1* | 5/2014 | Al-Ali et al. | 600/300 |
| 2014/0146745 A1* | 5/2014 | Huang et al. | 370/328 |

OTHER PUBLICATIONS http://www.spytek.co.za/ball-cam/, printed on Mar. 22, 2013, 2 pages.
http://news.bbc.co.uk/2/hi/technology/7734038.stm, "Grenade camera to aid UK troops", printed on Apr. 6, 2013, 2 pages.
http://jonaspfeil.de/ballcamera, "Throwable Panoramic Ball Camera", printed on Apr. 6, 2013, 2 pages.
http://www.serveball.com/, "Introducing the Throwable Ball Camera", printed on Apr. 6, 2013, 2 pages.
http://www.serveball.com/k/tech.php, "Serveball Technology Milestones", printed on Apr. 6, 2013, 7 pages.
Wilson, Dave, http://www.vision-systems.com/articles/2013/02/researchers-produce-wide-angle-video-with-ball-camera.html, dated Feb. 27, 2013, printed on Apr. 6, 2013, 2 pages.
Hodson, Hal, "Bouncy-ball cameras scout out dangerous situations", Oct. 28, 2012, http://www.newscientist.com/article/mg21628885.900-bouncyball-cameras-scout-out-dangerous-situations.html, printed on Apr. 6, 2013, 2 pages.
International Search Report and Written Opinion Issued by the U.S. Patent and Trademark Office as International Searching Authority for International Application No. PCT/US13/66205 mailed Mar. 7, 2014 (11 pgs.).

* cited by examiner

REMOTE SURVEILLANCE SYSTEM

CROSS REFERENCE TO RELATED APPLICATIONS

This application claims priority under 35 U.S.C. 119(e) to U.S. Provisional Application No. 61/717,130, filed Oct. 23, 2012, entitled "Bounce imaging". This application is related to the following applications filed concurrently herewith on Mar. 13, 2013:

U.S. patent application Ser. No. 13/801,649, entitled "Systems, Methods, and Media for Generating a Panoramic View;" and U.S. patent application Ser. No. 13/801,558, entitled "Remote Surveillance Sensor Apparatus".

TECHNICAL FIELD

Disclosed methods and apparatus relate to a surveillance system for capturing/collecting and displaying images and other sensor data of a remote location. Specifically, the disclosed methods and apparatus relate to a surveillance system including a remote sensor apparatus for collecting and transmitting image and other sensor data of a remote location and a receiver for processing and displaying the collected image and sensor data.

BACKGROUND

Police, soldiers, firefighters, and other first responders often must enter a building, a structure, or other places with little or no knowledge about potential dangers (e.g., lurking criminals/terrorists or enemy combatants, leaking flammable gas or radio active substance) that may be present in such locations. Search and rescue, law enforcement or military operations would benefit greatly if information about the interior of such locations can be known before entry. The existing surveillance systems are too complex and expensive to be accessible to frontline responders both in the developed and developing world.

SUMMARY

In one embodiment, a method is provided for a surveillance system including a plurality of remote sensor apparatus that each is configured for collecting data and a portable receiver for receiving data collected by one or more of the plurality of remote sensor apparatus. The portable receiver includes a radio-frequency identification (RFID) reader and is capable of running an application program for processing the received data and displaying the processed data on a display screen of the portable receiver. The remote sensor apparatus has a housing for containing a processing unit, a plurality of sensors coupled to the processor, an RFID unit and a wireless transceiver. The method includes reading, at the portable receiver, radio-frequency identification (RFID) stored in the RFID unit of one or more of the plurality of remote sensor apparatus using the RFID reader. The method also includes registering, at the portable receiver, the one or more of the plurality of remote sensor apparatus using the received RFID. The method further includes receiving, at the portable receiver, first data from a first active remote sensor apparatus. The received first data includes first sensor data collected from at least one of a first plurality of sensors installed in the first active remote sensor and RFID of the first active remote sensor apparatus. The method also includes processing, at the portable receiver, the first sensor data received from the first active remote sensor apparatus, if the RFID of the first active remote sensor apparatus matches the RFID of any of the one or more of the plurality of remote sensor apparatus.

In another embodiment, a method is provided for a surveillance system including a plurality of remote sensor apparatus that each is configured for collecting data and a portable receiver for receiving data collected by one or more of the plurality of remote sensor apparatus. The portable receiver includes a digital camera and is capable of running an application program for processing the received data and displaying the processed data on a display screen of the portable receiver. The remote sensor apparatus has a housing for containing a processing unit, a plurality of sensors coupled to the processor and a wireless transceiver. The method includes capturing, at the portable receiver, images including identification (ID) codes associated with one or more of the plurality of remote sensor apparatus using the digital camera. The method also includes decoding, at the portable receiver, the ID codes from the captured images using the application program. The method further includes registering, at the portable receiver, the one or more of the plurality of remote sensor apparatus using the ID code. The method also includes receiving, at the portable receiver, first data from a first active remote sensor apparatus. The received first data includes first sensor data collected from at least one of a first plurality of sensors installed in the first active remote sensor and ID code of the first active remote sensor apparatus. The method also includes processing, at the portable receiver, the first sensor data received from the first active remote sensor apparatus, if the ID code of the first active remote sensor apparatus matches the ID code of any of the one or more of the plurality of remote sensor apparatus.

In yet another embodiment, a method is provided for a surveillance system including a plurality of remote sensor apparatus that each is configured for collecting data and a portable receiver for receiving data collected by one or more of the plurality of remote sensor apparatus. The portable receiver includes a keyboard for receiving user inputs and is capable of running an application program for processing the received data and displaying the processed data on a display screen of the portable receiver. The remote sensor apparatus has a housing for containing a processing unit, a plurality of sensors coupled to the processor and a wireless transceiver. The method includes receiving, at the portable receiver, identification (ID) codes of one or more of the plurality of remote sensor apparatus using the keyboard and registering the one or more of the plurality of remote sensor apparatus using the received ID codes. The method also includes receiving, at the portable receiver, first data from a first active remote sensor apparatus, wherein the received first data includes first sensor data collected from at least one of a first plurality of sensors installed in the first active remote sensor and ID code of the first active remote sensor apparatus. The method further includes processing, at the portable receiver, the first sensor data received from the first active remote sensor apparatus, if the ID code of the first active remote sensor apparatus matches the ID code of any of the one or more of the plurality of remote sensor apparatus.

DETAILED DESCRIPTION

Figure 1:
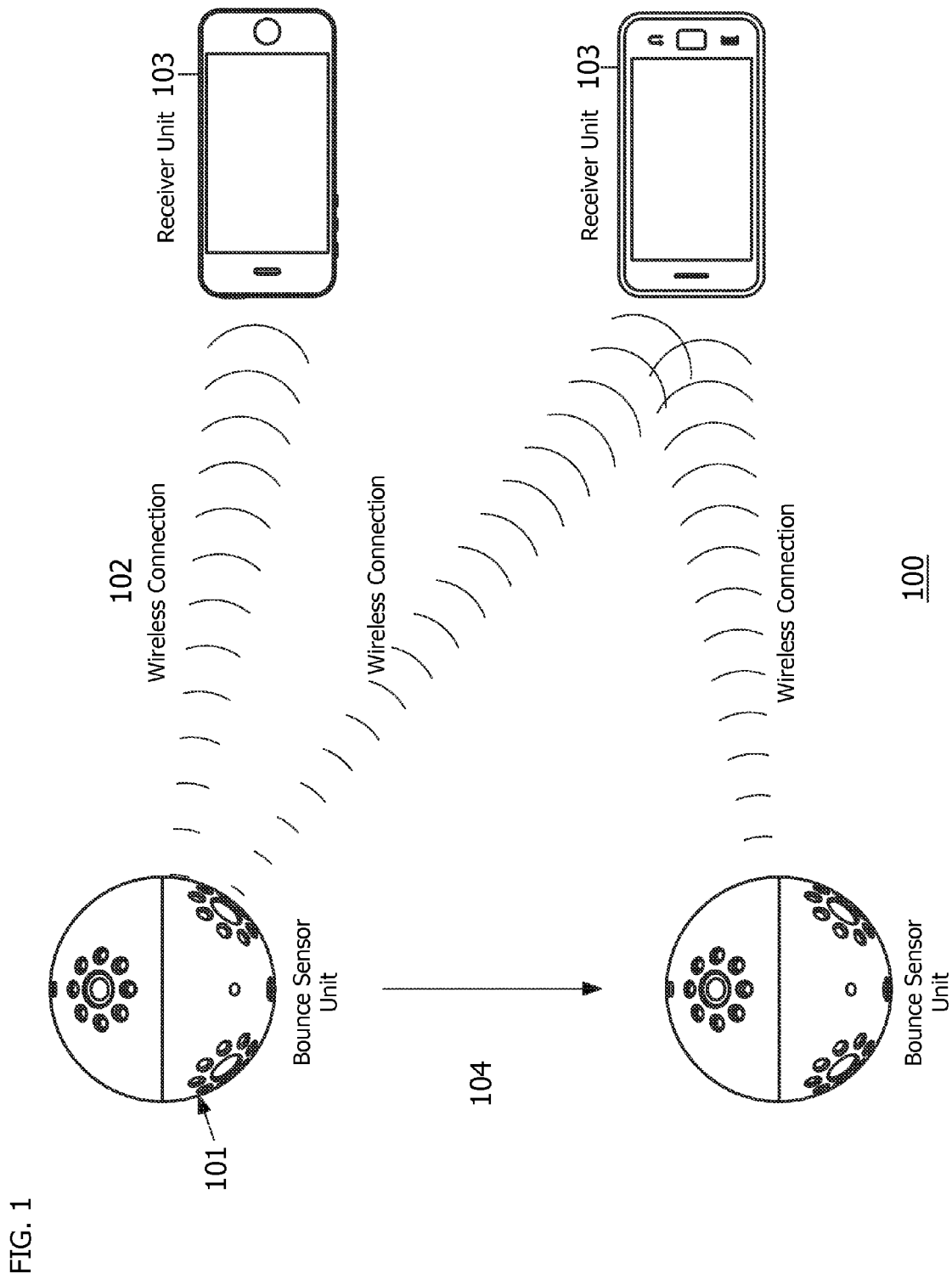
FIG. 1 illustrates a diagram of a remote surveillance system including a remote sensor apparatus and a portable receiver in accordance with one embodiment of the disclosed subject matter.

FIG. 1 provides a high-level overview of a surveillance system 100. Sensor unit 101 is a multi-sensor platform incorporating a reinforced housing, multiple image sensors with wide-angle lenses, infrared/near-infrared light-emitting diodes (LEDs), batteries, a processor, and additional sensors and is described in more detail below.

Sensor unit 101 transmits data gathered by its image sensors and sensors over a wireless connection 102 to a receiver unit 103. In one embodiment, the wireless connection is under the wireless fidelity (WiFi) 802.11b protocol. In other embodiments, the wireless connection can be achieved via other WiFi protocols, Bluetooth, radio frequency (RF), or a range of other communications protocols—including military and non-standard spectra.

Receiver unit 103 receives and processes data into a format usable to the user. For example, the unit can stitch images to provide panoramic views, overlay these images with data from the other sensors on the device, and play streamed audio from sensor unit 101's digital microphone over the receiver unit's speakers or headphones. In one embodiment, the receiver unit 103 is an Android-based tablet or smartphone running a custom-developed application program. In some embodiments, receiver unit 103 can be an iOS, Windows-based, or other smartphone or tablet. Such tablets may be hand-held or mounted, such as in some pouches that mount on the back of a partner's vest for the operator to view without having to hold the tablet. In some embodiments, the receiver unit 103 can be a laptop computer. In some embodiments, the receiver may be a heads-up or other display, such as those currently incorporated into military and first-responder units.

The server-client architecture is flexible, meaning that the server can exist on the sensor unit 101, on the receiver unit 103, or in a third station or device that serves as a router. In one embodiment, the receiver unit 103 serves as the server and the sensor unit 101 servers as the client. In some embodiments, the sensor unit 101 can function as the server and the receiver unit 103 as the client.

Sensor unit 101 can be paired to one or more receiver unit(s) 103 via quick response (QR) code, near-field/radio-frequency identification (RFID) communication, manual code entry, or other pairing method. Receiver units 103 can be paired with one or more sensor units 101. The pairing provides the user with the significant advantage that if the user already owns an Android or other compatible smartphone or tablet device, the user does not need to purchase a receiver unit but can rather simply pair his/her phone/tablet (via the application described below) to the sensor unit 101. In addition if sensor unit 101 is lost or damaged, receiver unit 103 can simply be paired to different sensor unit(s) 101. Similarly if receiver unit 103 is lost, sensor unit 101 can easily be paired to different receiver units 103. This pairing ability also allows multiple users to share the information from one or more sensor units or one or more receiver units. In addition, the receiver unit 103 can act as a repeater for other receiver units 103, allowing users outside the transmission range of one or more sensor units 101 to see the same information as is being viewed on receiver 103. In some embodiments, several sensor units 101 can use a wireless connection 104 to "daisy chain" to each other and thus extend their range by serving as repeaters. This connection also allows more extensive processing by using the relative position of units for mapping or three dimensional (3-D) imaging.

At a higher level, the system 100 can be extended by gathering data from many sensor units 101. For example, in search & rescue after earthquakes a common problem is the lack of reliable maps given building collapses, often resulting in multiple searches of the same site. By aggregating location information from multiple sensor units 101, a map overlay can be generated to avoid such duplication. Similar applications incorporating multiple sensor units 101 can assist in security and fire applications, among others.

Figure 2:
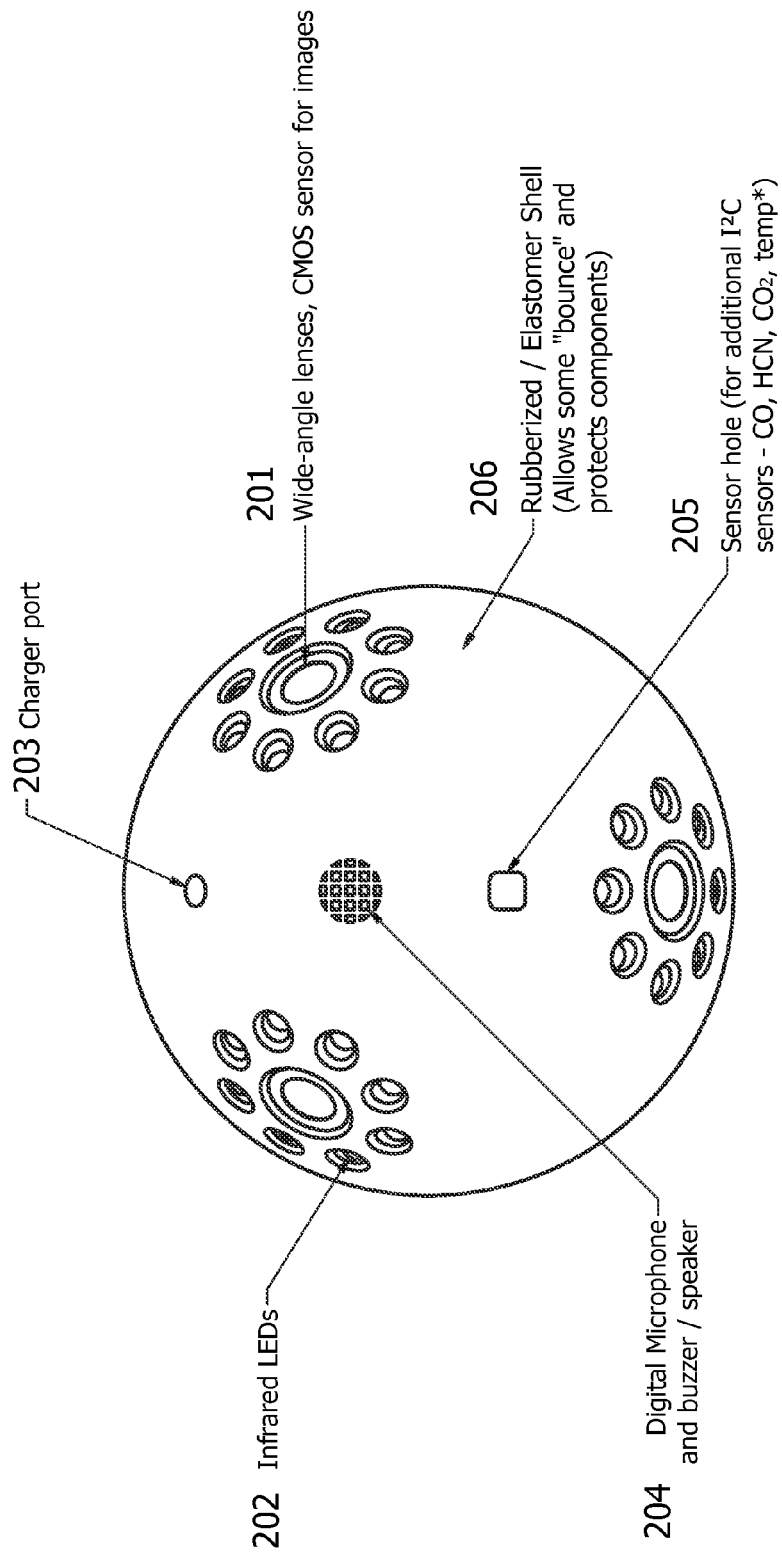
FIG. 2 illustrates a diagram of a remote sensor apparatus in accordance with one embodiment of the disclosed subject matter.

FIG. 2 illustrates a remote sensor unit, such as sensor unit 101. The use of wide-angle lenses 201 (e.g., fisheye lenses), allows for fewer image sensors than would otherwise be necessary to capture the scene (reducing cost and system complexity). The CMOS sensors behind wide-angle lenses 201 take short-exposure (e.g., $1/10,000^{th}$ or $1/100,000^{th}$ of a second) images of the scene observed through the lenses in order to compensate for the motion blur that might otherwise result from an image sensor unit being thrown or otherwise propelled into a space. To compensate for both the low-lighting conditions of the environment in which this unit is expected to be used, and for the light loss from a fast exposure, infrared/near-infrared LEDs 202 could be triggered briefly prior and during the exposure. This infrared/near-infrared light is visible to the CMOS sensors but is not within the range of human vision (allowing for both some degree of stealth and minimizing disturbance to bystanders). In one embodiment, monochrome sensors are applied because the monochrome sensors are significantly more light-sensitive than color sensors. In some embodiments, however, color CMOS sensors or sensors in other areas of the spectrum might be applied. In some embodiments, the lenses 201 are reinforced to resist heat and damage from exposure to chemicals or radiation.

Aperture 203 in the sensor-unit's 101 housing allows space for a charging port and for connecting a cable to update the system's 100 firmware. In one embodiment, the charger and firmware-update port 203 are one and the same in the form of a micro-USB connection. In some embodiments, the connector may be mini-USB or any of a range of potential connectors. The primary advantage of using a standard connector like micro-USB is that it makes charging the unit easier for example with a standard car cigarette-lighter charger, in contrast to other systems that require a dedicated charging station.

The aperture 204 for a digital microphone and speaker serves two functions. First, it allows the digital microphone to be close to the surface of the sensor unit's housing and thus provide better audio to the operator listening to this audio stream via the receiver unit 103. Second, it allows the sensor unit to project audio via a small speaker or buzzer—a function that allows for locating the sensor unit once deployed and importantly to create a loud sound which can be a useful diversion when employed by police or in similar settings. In some embodiments, the speaker can convey audio from the receiver unit to assist in communication between the person at the receiver unit and persons near the sensor unit (e.g. in hostage negotiations). In some embodiments, high-intensity LEDs in the unit can be triggered along with the speaker to create a more substantial diversion.

The aperture 205 allows additional sensors to be exposed to the outside environment to gather the additional readings that are overlaid on the information provided on the display of the receiver unit 103. This aperture is compatible with a wide array of sensors, many of which can communicate with the central processor via the simple inter integrated circuit ($I^2C$) format. In one embodiment, the sensors detect carbon monoxide, temperature, and hydrogen cyanide gas. These gases in particular have been found to pose a hazard to firefighters in the aftermath of a blaze. However, the system 100 is compatible with a wide range of sensors and can be easily adapted to support the sensors in the Table 1 below and many others using $I^2C$ and similar standard formats, protocols, or analog outputs. In addition, different sensor combinations, including oxygen ($O_2$) and other gases or Chem-Bio-Radio-Nuclear sensor can be used, depending on configuration.

TABLE 1

Examples of sensors compatible with Bounce Imaging multi-sensor platform

| Smoke | Alcohol | Temperature thermometer | Smoke | Geiger counter (radiation) |
|---|---|---|---|---|
| CBRN (chem/bio/nuclear/radiological) | Magnetic | Humidity | Water | Barometric pressure |
| Vibration detector | Motion sensor | Sonic rangefinder | Laser rangefinder | Stereo imaging |
| Voltage | Color/wavelength | Spectrometers | Depth | GPS |
| Methane | Carbon monoxide | Carbone dioxide | Propane and other flammable gas | PIR |
| Hal-Effect | Impact sensor | Thermal imager | Proximity | Glassbreak |
| Shock | RFID | Compass | pH/acidity | Gravity |
| Electronic signals/RF | Oxygen, nitrogen, hydrogen & other atmospheric gases | Hazardous gas sensors (HCN, $H_2S$, etc.) | Coal dust, coal gas | Biological compounds |

The rubber or elastomer shell over the hard/reinforced inner shell serves two purposes. First, it absorbs much of the force of an impact as the unit enters a space and hits a wall, floor, ceiling, or other object—protecting the image sensors and internal components of the sensor unit. Second, it provides a degree of "bounce" to the sensor unit which allows it greater travel within a space. For example, this allows a police operator to bounce the unit around a corner to get a view of a corridor before having to enter it, or allows a search and rescue worker to search deeper inside a collapsed building by having the unit bounce through crevices and pockets in the debris (where a unit without this housing would be more likely to get stuck). In one embodiment, this outer shell is achieved by means of an elastomer or rubber overmold simultaneously poured with an injection mold of a hard plastic inner shell. In other embodiments, the outer rubber or elastomer shell can be molded separately and attached to the hard internal metal, composite, or plastic shell by means of an adhesive, screw, subsequent compression or injection molding, or snap-fit mechanism. In some embodiments, the outer shell is reinforced via the choice of elastomer, rubber, or other material to sustain the harsh temperatures and chemical and radiological environments presented by firefighting and industrial inspection applications. In some embodiments, rubber/elastomer "bumpers" on the surface of the outer shell allow for greater impact resistance without blocking the field of view of the image sensors.

Figure 3:
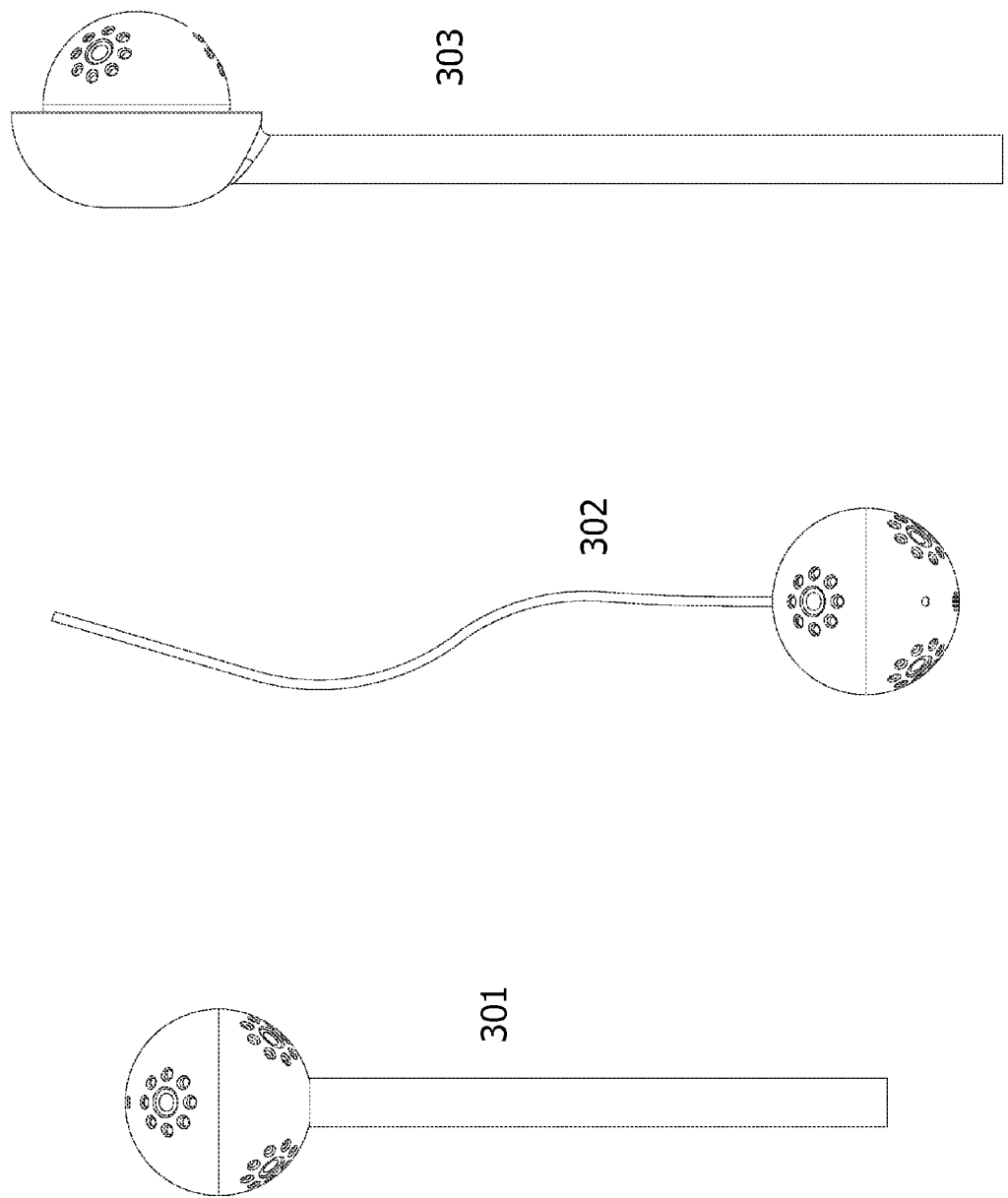
FIG. 3 illustrates a diagram of deployment methods for deploying a remote sensor apparatus in accordance with one embodiment of the disclosed subject matter.

In one embodiment, the sensor unit is deployed by an operator who throws or rolls the unit into the space. FIG. 3 illustrates some examples of other methods of deployment. Pole 301 can be attached to a hole in the housing of sensor unit 101 to allow the unit to be inserted slowly into a space. Tether 302 can be used to retrieve the sensor unit 101 from a space when it is difficult to retrieve manually, such as when searching for a victim inside a well or when inspecting a pipe. In some embodiments, this tether 302 can provide supply power and act as a communications link for the unit, especially when continuous surveillance is required or adverse conditions limit wireless communications range. Optional unit 303 is similar to a tennis-ball thrower and can be used to extend the range of the sensor unit 101 beyond where a human operator can throw. Other embodiments can otherwise be propelled via air-cannon or other propulsion system.

In some embodiments, the sensor unit is partially self-propelled and extends its travel and propels itself via two methods—one or many internal motors whose torque cause the sensor unit to move, or a series of counterweights which are shifted to roll the sensor unit. In some embodiments, these movements are random and achieve greater coverage of the room in an unguided way or in a probabilistic fashion. In other embodiments, the propulsion is guided via the receiver unit 103 and more precise control of the motors and/or counter-weights. Different applications require different levels of guidance (e.g. industrial inspection prefers a random and thorough sweep, security applications may prefer control).

Figure 4:
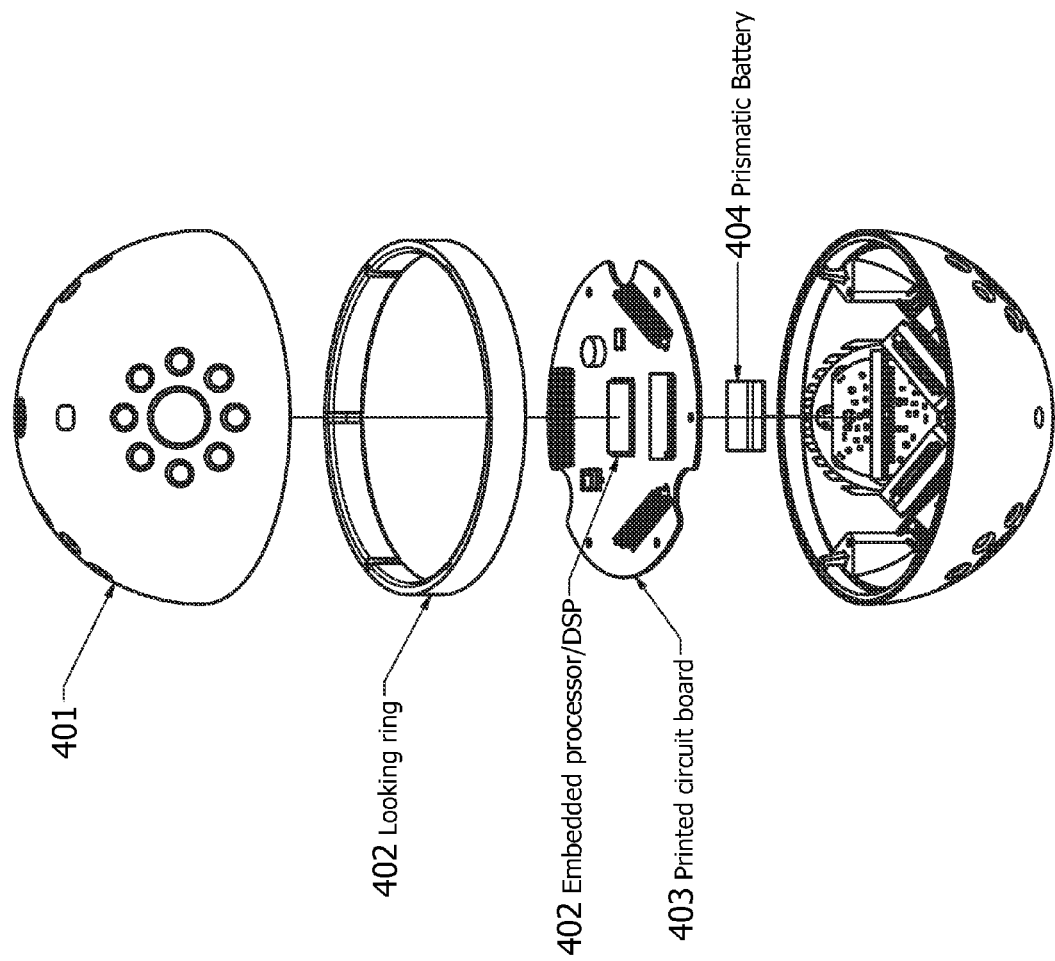
FIG. 4 illustrates a diagram showing a high-level view of the internals of a remote sensor apparatus in accordance with one embodiment of the disclosed subject matter.

FIG. 4 provides a high-level view of the internals of the device. In one embodiment, the shell is composed of two symmetrical halves 401 with equal numbers of apertures plus a central locking ring. This design allows for lower manufacturing costs through injection molding using a single mold shape. As described above, the hemispheres 401 themselves consist of a hard inner structure (injected plastic in one embodiment) and an elastomer or rubber outer layer for "bounce" and for impact-absorption. In one embodiment, each hemisphere includes three image sensors with wide-angle lenses ringed with 8 near-infrared LEDs for illumination. Locking ring 402 allows for simpler assembly with symmetrical hemispheres, reducing labor required for manufacture. In some embodiments, the internal shell structure can be a metal like aluminum or a carbon fiber or other composite to improve strength and component protection without significantly increasing weight.

Printed circuit board (PCB) 403 holds many of the components of the system, most importantly embedded processor and/or digital signal processor 402. In one embodiment, the processor 402 is a BlackfinF548 by Analog Devices. In some embodiments, other processors are used. Printed circuit board 403 also hold connectors (in one embodiment, insulation displacement connector (IDC) ribbon cable connectors) for the image sensors and connection points for the other sensors, microphone, and other components. Below the printed circuit board 403 there is a power supply board. In some embodiments, the need for connectors is eliminated via a single rigid-flexible PCB for both the central processor and the image sensors. In some embodiments, the power supply is included on the central PCB 403. The printer circuit board also houses the wireless module, shown in figures that follow.

The central PCB 403 is mechanically supported at six points once the sensor unit shell is closed. This provides significant support to the board while allowing it some freedom of movement and flexion to better survive impacts when the sensor unit is thrown. In addition, a rubber insert at the support points further cushions the central printed circuit board 403 and its components from shocks.

The sensor has one or more batteries 404 to power the central processor, wireless module, image sensors, LEDs, and other sensors and components. In one embodiment, two batteries 404 are housed symmetrically in the two hemispheres. This arrangement both balances the sensor unit, allowing for more predictable travel through the air, and is mechanically optimal from an impact/resilience perspective. In some embodiments, the batteries run through the center of a "donut-shaped" central PCB, again for balance and mechanical reasons.

The image sensor boards 405 house the imaging sensors (in one embodiment, a complementary metal-oxide-semiconductor (CMOS) sensor, in some embodiments, a charge-coupled device (CCD) or other imaging sensor) and attach to each hemisphere 401. The position and orientation of the image sensor boards 405 is optimized to maximize the overlap in field of view across all the sensors to ensure global coverage of the space being imaged. This is important because standard CMOS sensors are rectangular (e.g. WVGA is 752×480 pixels) and thus their vertical field of view is narrower than their horizontal field of view with a standard lens. This is further complicated by very wide-angle lenses. Thus the orientation of the image sensor boards 405 is important to ensure full coverage and sufficient overlap for image stitching (described below). In one embodiment, the six image sensor boards 405 are equally spaced across the surface of the sensor unit and are rotated approximately 90-degrees from an adjacent image sensor board 405. In some embodiments, different combinations of spacing and rotation are used, but always with the objective of ensuring sufficient overlap across fields of view to ensure global coverage and enough overlap for image stitching.

Figure 5:
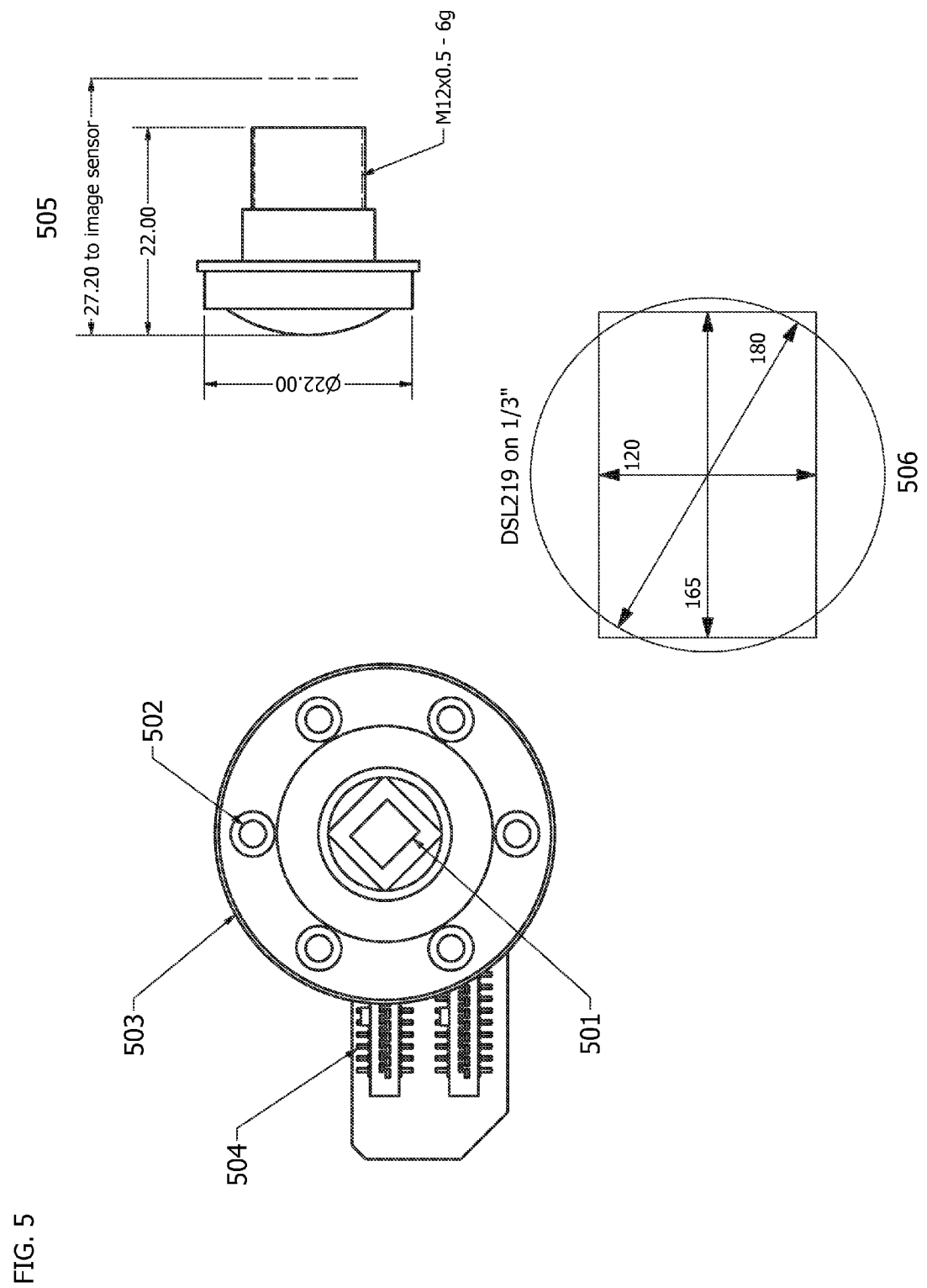
FIG. 5 illustrates a diagram showing a board including an image sensor and a wide-angle lens in accordance with one embodiment of the disclosed subject matter.

FIG. 5 provides a view of the image sensor board. The image sensor board houses the imaging sensor 501. In one embodiment, the imaging sensor 501 is an Aptina V022MT9-series monochrome CMOS sensor. This sensor has very good low-light performance and dynamic range with low noise and can detect the wavelength of the light that the infrared (IR) or near-IR LEDs emit, all important for the short-exposure, dark environment images the sensor unit is capturing. In some embodiments, different CMOS or CCD sensors are used, including sensors that are not limited to monochrome (e.g. color sensors) and sensors in other ranges of the light spectrum, such as infrared and ultraviolet.

One or more LEDs 502 provide illumination to both light dark environments and to compensate for the light loss associated with short exposures. In one embodiment, these LEDs 502 are near-infrared, high-intensity LEDs with their light brightest at around 850 nanometer (nm). This light is visible to the imaging sensors 501 but not to the human eyes. In some embodiments, the LEDs emit in the visible light spectrum (particularly for color applications or when the LEDs serve a diversionary purpose). In some embodiments, LEDs emit at other wavelengths appropriate to the imaging sensor being employed.

Lens holder 503 on the imaging board holds the lens in place and at the proper focus above the CMOS sensor. In some embodiments, the lens holder is incorporated into the sphere casing 401. This both allows the parts to be injection molded in plastic and rubber and protects the lenses from impacts. The selection of lens 505 allows the sensor unit 101 to maximize the use of its imaging sensor 501. The fisheye lens 505 allows for an effective image footprint that covers nearly entirely or entirely the CMOS sensor as shown in 506. This is not true for many lenses, which "cut off" valuable pixels by covering only part of the image sensor.

Ribbon cable connector 504 connects the imaging board in FIG. 5 with the central PCB 403. In some embodiments, the imaging board in FIG. 5 is connected to PCB 403 via inflexible printed circuit board layer, effectively making the central PCB and imaging boards a single printed circuit board. In some embodiments, other connectors are used depending on requirements for data transfer rate and mechanical performance.

Figure 6:
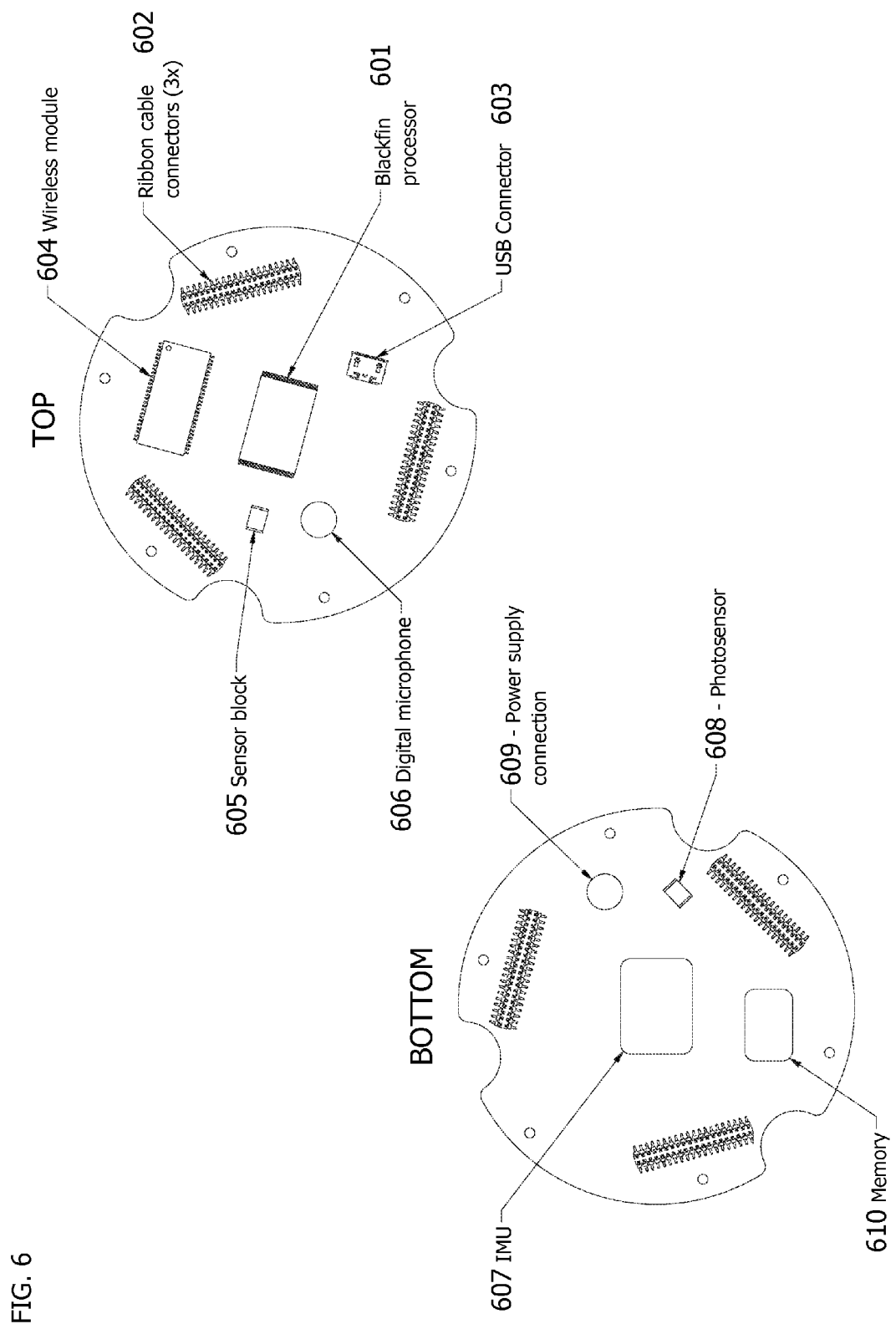
FIG. 6 illustrates a diagram showing a top view and a bottom view of a central printed circuit board included in a remote sensor apparatus in accordance with one embodiment of the disclosed subject matter.

FIG. 6 shows the top and bottom of the central printed circuit board. This board houses the microprocessor (MCU) and/or digital signal processor (DSP) 601. In one embodiment, the processor is an Analog Devices Blackfin 548BF DSP. This processor handles the multiple streams of image and sensor data being captured by the sensor unit's imaging and other sensors at a reasonable component cost and power drain. In some embodiments, other microprocessors and/or digital signal processors are used, including units with multiple cores. The multi-core processing unit allows Linux or other operating system (OS) to run on the processors, easing the implementation of networking protocols discussed below.

Ribbon cable connector 602 connects the cables running to the central PCB from the imaging boards described above in FIG. 5. In one embodiment shown, three of these connectors lie on each side of the central PCB. In some embodiments, other types of connectors are used. In some embodiments, the central PCB connects to the imaging boards via flexible layers of the printer circuit board, forming effectively one single board.

USB connector 603 allows the central printed circuit board to connect to an external computer and external power sources. The primary purposes of this USB connection, which in one embodiment uses a micro-USB connector tip, are to load and update the firmware for the sensor unit and to allow for testing, debugging, and if necessary calibration of the unit.

Wireless module 604 transmits image and other sensor data processed by the microprocessor 601 to the receiver unit 103. In one embodiment, the wireless module is a WiFly GSX 802.11b/g module with file transfer protocol (FTP) and hypertext transfer protocol (HTTPS) client services. In some embodiments, different wireless modules are used, such as the Texas Instrument's CC3300 module. In some embodiments, other types of wireless modules, incorporating Bluetooth transmitters or transmitters in other ranges of the spectrum (such as those for dedicated military or security communications channels) are employed. The type of wireless transmitter in each embodiment is tied to end-user needs (for example, the US military operates in restricted frequency ranges and under proprietary protocols).

Sensor block 605 illustrates a connection point for the non-imaging sensors in the unit. In one embodiment, the sensor block 605 connects to a digital temperature sensor, a carbon monoxide sensor, and a hydrogen cyanide sensor. In other embodiments, this sensor block can connect to any suitable sensors, including those listed in Table 1. In one embodiment, a cable connects the sensors on the surface of sensor unit 101, but some sensors (e.g. the Geiger counter) do not need to be surface-mounted.

Digital microphone port 606 connects the digital microphone mounted on the surface of sensor unit 101 to the central PCB. In one embodiment, this microphone is a mono micro-electro-mechanical system (MEMS) microphone with digital output. In some embodiments, the microphone may be stereo or may connect to several microphones on the surface of the sensor unit 101. In some embodiments, the microphone is not surface mounted.

An inertial measurement unit (IMU) 607 on the central printed circuit board provides information about the orientation and direction in which the sensor unit 101 was thrown. This information is useful for providing an image with reference points for the user, such as which direction is up and in which direction the sensor unit 101 was thrown. In the absence of such information, the images displayed on the receiver unit 103 might be disorienting. In one embodiment, the IMU is an Invensense MPU 6000, which is a 6-axis gyroscope-accelerometer module. In other embodiments, 9-axis IMUs are used to compensate for IMU "drift" problems. In some embodiments for more extreme motion, multiple IMUs are used. In some embodiments, no IMU is used, relying primarily on software to compensate for orientation as needed.

A plurality of photo (light) sensors 608 connect to the central PCB. These simple, surface mounted sensors provide information about ambient lighting that allow the sensor unit 101 to modify shutter exposures and LED flash intensity. In some embodiments, these photo sensors are not included and the sensor unit uses the CMOS sensors milliseconds before capturing and image to calibrate lighting and exposure duration.

Power supply connection 609 indicates where the central PCB connects to a power supply board or external power supply. In some embodiments, there is a separate power supply PCB. In some embodiments, the power supply components are mounted on the central PCB. These power supply components connect either to internal batteries (e.g., lithium ion (LiON) batteries) or to an external power supply. In some embodiments, power can be supplied to this board via the tether 302 shown in FIG. 3.

In some embodiments, memory 610 includes additional memory (e.g. SDRAM, flash memory and a range of other types of memory). This memory allows for some buffering by the microprocessor 601 as needed. In some embodiments, no external memory is needed as the processor can use onboard memory.

Figure 7:
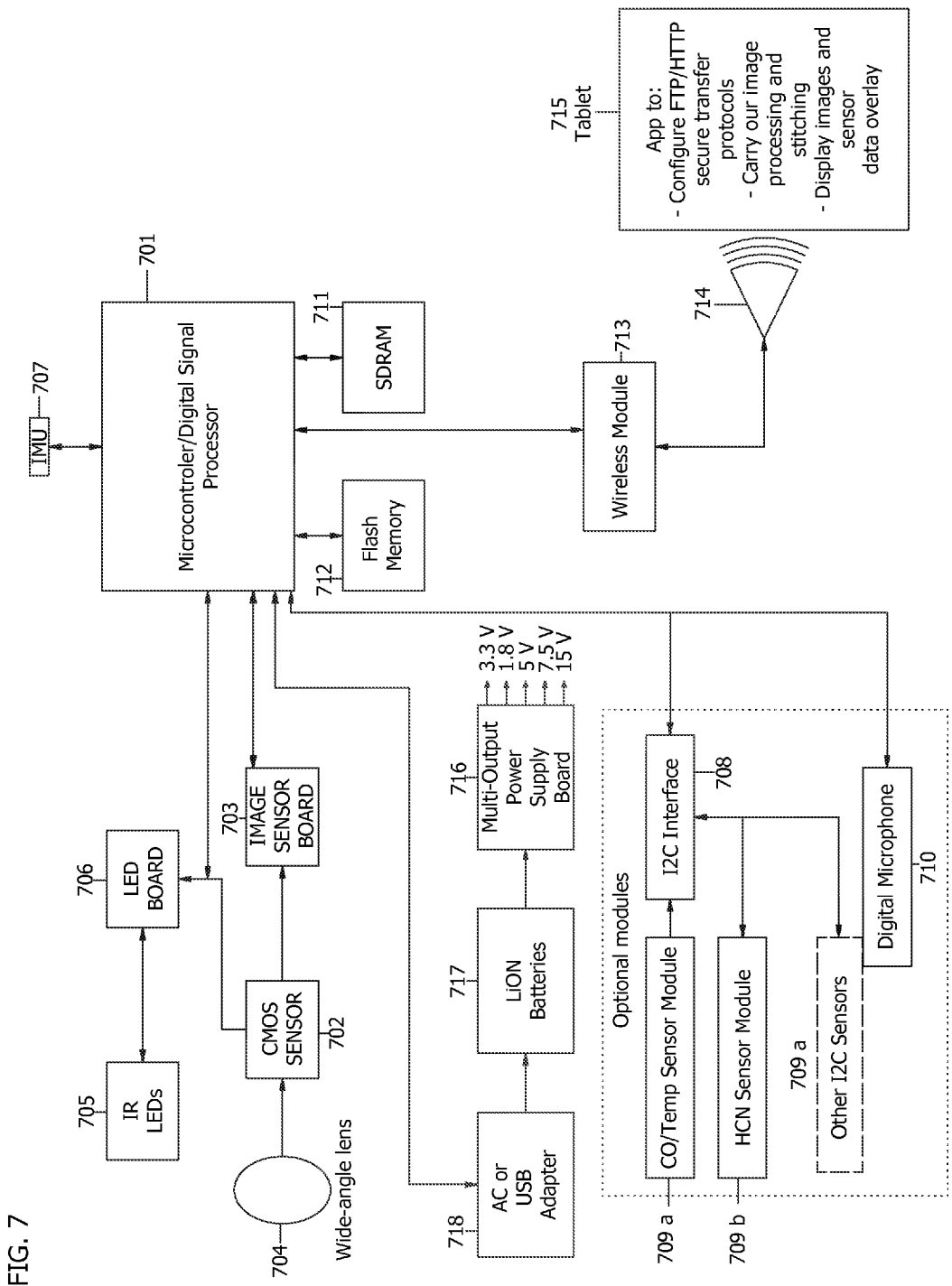
FIG. 7 illustrates a block diagram of a remote sensor apparatus in accordance with one embodiment of the disclosed subject matter.

FIG. 7 provides a high-level view of the hardware design and operation. Microprocessor and/or digital signal processor 701 (in some embodiments, a Blackfin 548BF, in some embodiments, different microprocessors/DSPs as discussed above) triggers imaging sensor 702 (in some embodiments, an Aptina V022MP9 series monochrome CMOS sensor, in some embodiments, different imaging sensors as discussed above), which is mounted on image sensor board 703, to capture an image.

Imaging sensor 702 takes a quick calibration read to determine light conditions in the space being imaged, and based on these conditions determines the appropriate exposure and whether (and how strongly) to trigger LEDs 705. In some embodiments, the calibration is carried out using a photosensor 608. In some embodiments, high-intensity near-infrared LEDs 705 with max output at a wavelength of 850 nm are used, in other embodiments different LEDs are used (as discussed above) appropriate to the application. LEDs 705 rest on an LED board 706 controlled in some embodiments by the CMOS sensor 702 and in some embodiments by the microprocessor 701.

IMU 707 provides the microcontroller 701 with information about the orientation and acceleration of the sensor unit 101 as it is moving through its path of travel in the air and on the ground. The microcontroller 701 associates this information with images and transmits it to the receiver unit. This data allows the receiver unit 103 to provide information to the end user that allows that user to understand in which direction the sensor unit was thrown and what orientation the unit had when it took an image. The data can also help determine how to display the images and position information on the receiver unit screen. In some embodiments, no IMU is used, relying on software correction methods.

Sensor interface 708 connects additional analog and digital sensors to the microprocessor 701. In the diagram shown (example of one embodiment), an I²C interface connects a carbon monoxide/temperature sensor 709a and a hydrogen-cyanide sensor 709b to the microprocessor. In some embodiments, a wide range of sensors can be employed, examples of which are listed in Table 1 above.

Digital microphone 710 captures audio from the environment and transmits this information back to microprocessor 701, which in turn may make it available to receiver unit 103. In some embodiments, there can also be a speaker or buzzer connected to the microprocessor 701, as discussed above. In some embodiments, stereo microphones or other sound-gathering devices (e.g. hydrophones), both analog and digital, are employed.

In some embodiments, microprocessor may employ memory 711, flash memory 712, or other forms of storage to buffer or store data or files. In some embodiments, all buffering and storage may be conducted onboard the microprocessor 701.

Microprocessor 701 accepts and processes information from the imaging sensors 702 and/or the additional sensors 709 and/or the microphone 710 and/or IMU 707. It then transmits data or files including the processed information to onboard flash memory 712 or other memory. In some embodiments, the microprocessor 701 transmits the data or files directly to the receiver unit 103 via a wireless module 713. In some embodiments, as discussed above, this is a WiFly module transmitting under 802.11b. In some embodiments, a different wireless module is used. Wireless module 713 transfers data and communications back and forth between receiver unit 103 and sensor unit 101 over a wireless link with the aid of antenna 714. In some embodiments, the wireless module 713 may broadcast data without a link being established, as in cases when links are difficult to establish.

Receiver unit 715 (same as receiver unit 103), receives data from the sensor unit 101 and then processes and displays this information to a user or users. In some embodiments, this receiver unit is an Android-based tablet running an Android application program. In some embodiments, this may be another smart device such as an iPad, iPhone, Blackberry phone or tablet, Windows-based phone or tablet, etc., as discussed above. In some embodiments, this may be a computer. In some embodiments, this may be a second sensor unit 103 acting as a repeater for this unit, or forming a mesh network of units.

Power supply 716 provides the electrical energy for the hardware design. The power supply may draw current from battery 717. In some embodiments, battery 717 is a prismatic lithium-ion battery. In some embodiments, it may be one or many alkaline batteries. In some embodiments, battery 717 may take another form of high-performance battery. In some embodiments, power supply 716 will connect directly to an external power supply 718. In some embodiments, tether 302 may provide the connection to such an external power supply. In some embodiments, external power supply/adapter 718 is an A/C or USB adapter that helps power the unit 101 and/or charges the battery 717.

Figure 8:
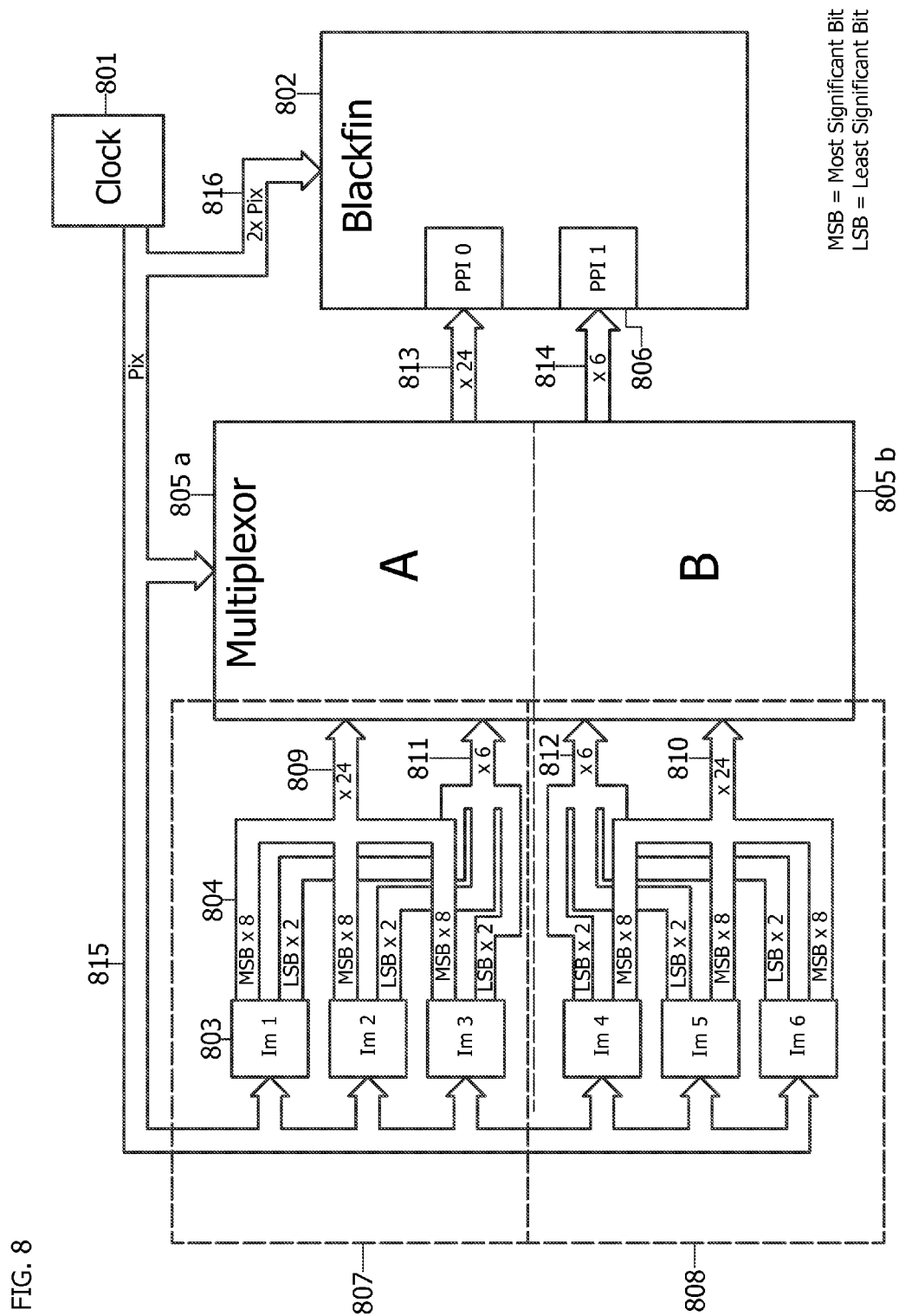
FIG. 8 illustrates a block diagram showing a processor simultaneously receiving image data from a plurality of image sensors using multiplexors in accordance with one embodiment of the disclosed subject matter.

FIG. 8 describes the process via which multiplexing is used to allow the microprocessor 701 to accept data from a plurality of image sensors. In one embodiment, as shown in FIG. 8, a BlackfinBF548 microprocessor 802 accepts data from six imaging sensors 803 over only two parallel peripheral interfaces (PPI) 806. Each of 6 image sensors 803 are driven by same clock source 801, which ensures that image data from them is synchronized. Each of Image sensors 803 uses 10 bit data bus to transfer images. Six image sensors 803 are separated into two groups of three image sensors 803 in each group—groups 807 and 808. Eight Most Significant Bits from 3 image sensors 803 in each group are placed sequentially, forming 24-bit signal 809 and 810. Two Least Significant Bits from 3 image sensors 803 in each group are placed sequentially, forming 6-bit signal 811 and 812. Two 24-bit signals 809 and 810 are multiplexed by multiplexor 805A into single 24-bit signal 813. Two 6-bit signals 811 and 812 are multiplexed by Multiplexor 805B into single 6-bit signal 814. The 24-bit signal 813 is sent to $PPI_0$ port of BF548 802. The 6-bit signal is sent to $PPI_1$ port of BF548 802. Multiplexor 805 passes data from group 807 during high level of clock signal 815, and from group 808 during low level of clock signal 815, resulting in doubling data rate of the image data. In order to correctly receive this data, both of PPI ports 806 must use clock 816, which is double the clock used by image sensor. In order to properly synchronize multiplexing of the image data 804, clock source 801 allows phase control between clocks 815 and 816. In some embodiments, this combination of multiple image data streams is achieved via the use of a Field-Programmable Gate Array (FPGA). In some embodiments, small microprocessors associated with each of the image sensors can buffer data and thus address the multiple-data-input problem solved through multiplexing above.

Figure 9:
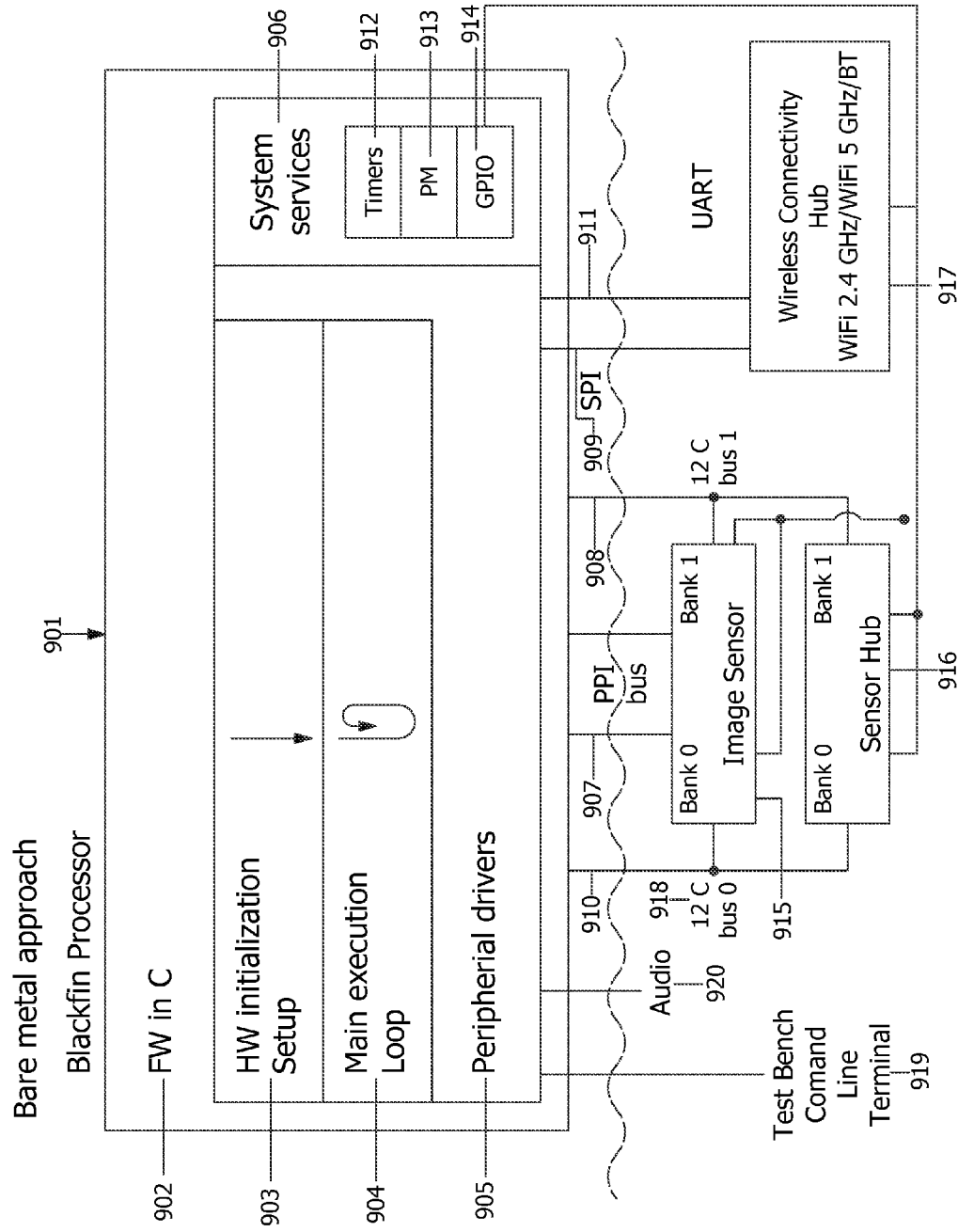
FIG. 9 illustrates a block diagram showing a high-level view of the firmware implementation of a remote sensor apparatus in accordance with one embodiment of the disclosed subject matter.

FIG. 9 offers a high-level view of the firmware implementation on the sensor unit 101. In some embodiments, the on-board processor 901 runs a full operating system, such as Linux or Real Time OS. In the diagram in FIG. 9, an embodiment is shown which does not rely on an operating system and instead uses a plain infinite main execution loop known as "bare metal" approach. The firmware 902 for microprocessor 901 may be written in C, a widely used programming language. In some embodiments, different programming languages might be utilized—interpreted scripting and/or assembly. The firmware begins its executions upon reset and runs one time initialization of the hardware first, as illustrated in 903. From there, the main execution loop is entered and run repeatedly as indicated in 904. Firmware initialization and main loop for the sensor unit 101 relies and utilizes peripheral drivers 905 and system service 906 source and/or binary code. Peripherals and services may be specific to on-board processor 901 and may vary in other embodiments. Peripherals for 901 processor include PPI bus 907 for imaging sensors, $I^2C$ bus 908 for additional non-imaging sensors control and data acquisition, serial peripheral interface (SPI) bus 909 for wireless connectivity, $I^2S$ bus 910 for audio and universal asynchronous receiver/transmitter (UART) channel 911 for auxiliary communication functionality. Services include timers 912, power management facilities 913 and general purpose I/O 914 for various system needs.

Through peripheral drivers and system services, the firmware 902 controls and utilizes external devices attached to processor 901 by mechanical and electrical means. Set of image sensors 915 is controlled and utilized via PPI bus 907 and $I^2C$ bus 910. Audio functionality 920 is controlled and utilized via $I^2S$ bus 910. Wireless connectivity module 917 is controlled and utilized via SPI bus 909. Set of system sensors 916 (temperature, toxic gases, buzzer, IMU, etc) is controlled and utilized via $I^2C$ bus 918. UART channel 911 and its multiple instances can serve many auxiliary control and utilization needs, e.g., test bench command line terminal 919 or alternative access to wireless connectivity module 917. Most of system devices external to the processor 901 are also controlled and utilized via GPIO 914 pins. Utilization and control for image sensor functionality in firmware allows proper acquisition of images into processor's 901 internal memory. Similarly other data is collected from all system sensors. To deliver collected information to user interface devices, the firmware uses wireless connectivity functionality embedded in the module 917, which provides 802.11 WiFi protocol along with higher level communication stacks, namely TCP/IP, Berkeley software distribution (BSD) sockets, FTP and HTTP. In some embodiments other protocols and communication stacks might be utilized—Bluetooth, 802.15 and custom and proprietary.

Figure 10:
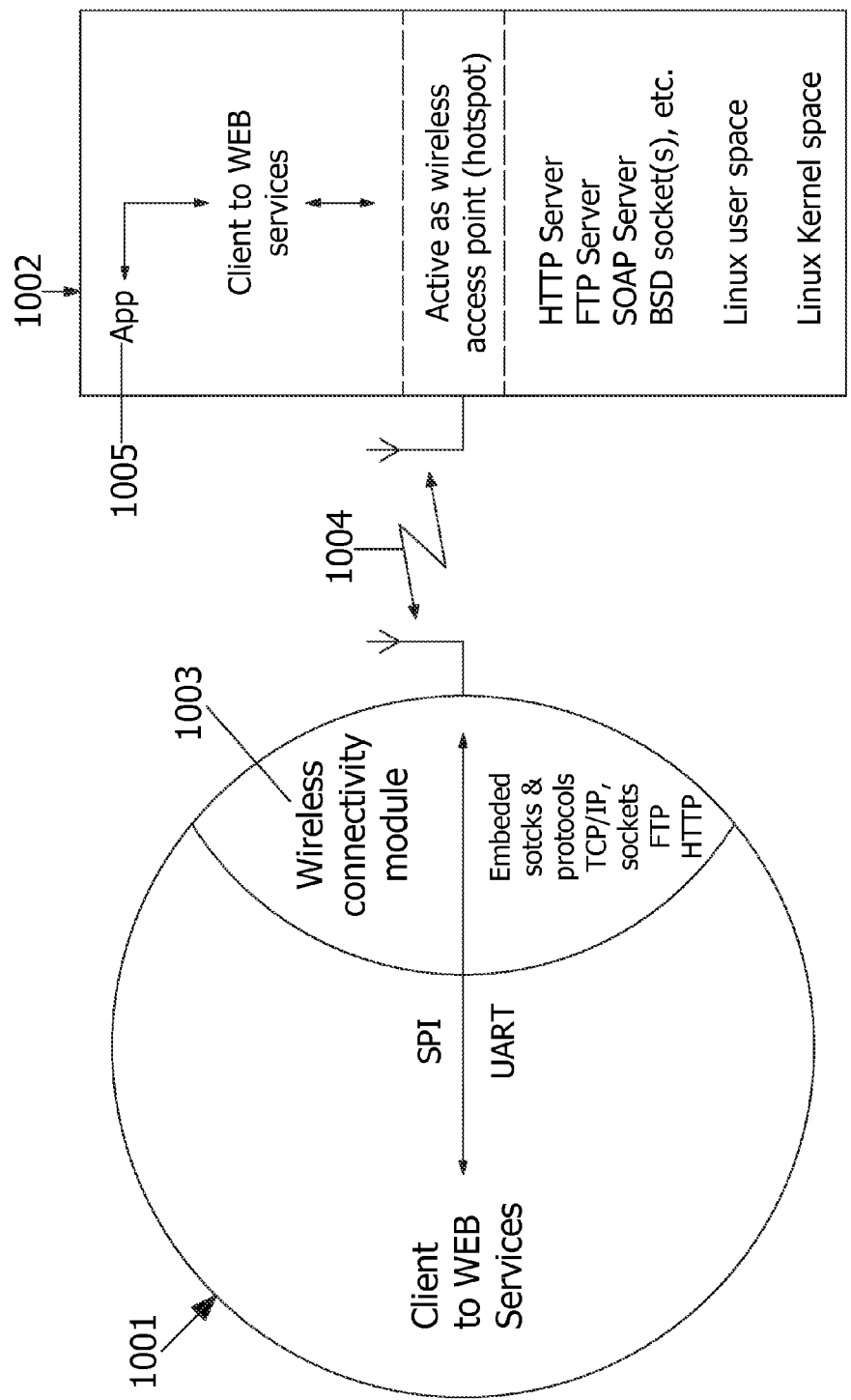
FIG. 10 illustrates a block diagram showing communication modules included in a remote sensor apparatus and a receiver device in accordance with one embodiment of the disclosed subject matter.

FIG. 10 illustrates one of several possible architectures for communication between the sensor unit 1001 and the receiver unit 1002. In one embodiment, shown here, the sensor unit acts as WEB service client to the receiver unit and sensor's wireless module 1003 facilitates such behavior by providing embedded plain TCP/IP, BSD sockets, FTP and HTTP protocols and stacks. Microprocessor 701(901) communicates with wireless module 1003(917) over UART or SPI connection. In other embodiments, sensor unit 1001 may implement and act as a server to the receiver unit client with support from the wireless module. Data transmission might also occur in ad hoc fashion without a clear server-client arrangement established.

In one embodiment, wireless module 1003 links as a client to a server on receiver unit 1002 via an 802.11b wireless link 1004. In some embodiments, the server on the receiver unit 1002 (e.g., an Android tablet) operates at the operating system level (e.g., Android Linux). In other embodiments, the server or client on the receiver unit can be implemented at the application level (e.g., at the Java level in an application program). In the embodiment shown, the application program 1005 both configures the server properties of the receiver unit and processed data from the sensor unit 1001.

Figure 11:
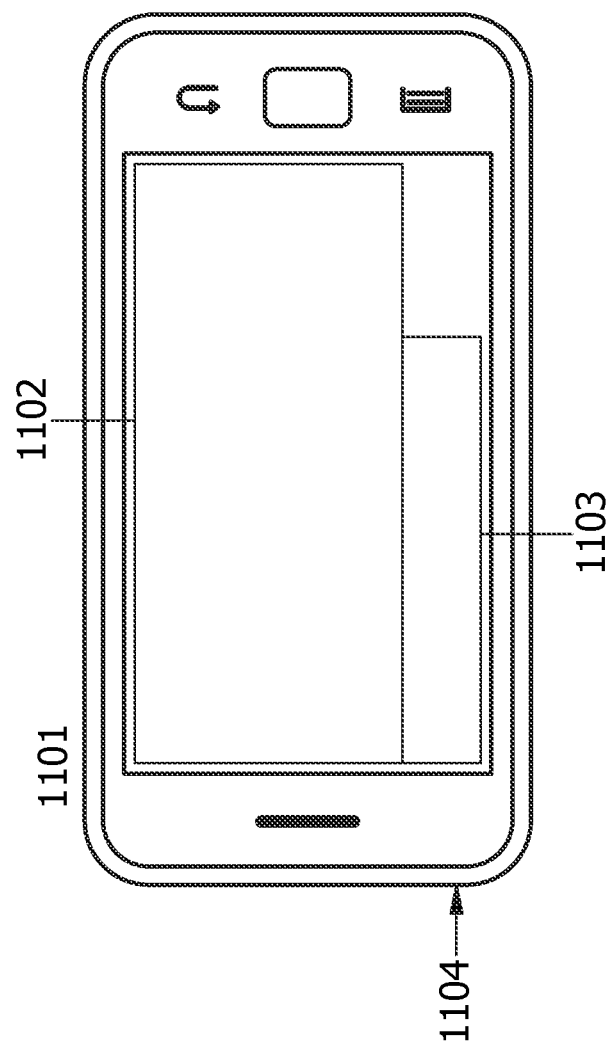
FIG. 11 illustrates a diagram showing a receiving device in accordance with one embodiment of the disclosed subject matter.

FIG. 11 shows a simplified, example, high level diagram of the design of the display application on receiver unit 1101. This application displays for the user a series of images 1102 of the space into which the sensor unit 101 is thrown. These images 1102 can cycle automatically or be advanced manually, and display the perspective of the sensor unit 1101 at different intervals over the course of its travel. The application on the receiver unit that produces these images is described below. Images 1102 are oriented based on IMU information from the sensor unit 103 in such a way as to make the images intelligible to the user (e.g. right-side up and pointing in the direction that the sensor unit 101 was thrown). This is important for the user, as it provides visual reference points important for making decisions about entering a space (e.g. "Is that object to the right or left relative to where the ball was thrown?").

In some embodiments, the application has a "deep inspection mode", which allows the user to get more information about the scene displayed. In this mode, the user can get a "sensor unit's 101 perspective" as if he/she were standing in the place the image is taken and could look left/right/up/down. To navigate this environment (which in some embodiments can be made immersive through the addition of headphones and goggles/a heads-up display), the user can use gestures on the screen or interface to, for example, swipe fingers right to look right or swipe fingers up to look up. Because first responders often use gloves and can not use finger-activated swipes, the application also has an option to use a receiver unit's built-in gyroscopes and accelerometers to navigate the image. Thus a user can tilt the device slightly to the right to get the image to rotate as if looking to the right. Whether "deep inspection mode" is used or not, the application defaults to a single image with data overlay to quickly provide crucial information—only providing the additional functionality if the user has time and mental bandwidth to decide to access it.

Sensor data overlay 1103 provides an example of how additional sensor data is displayed in some embodiments. In one embodiment, data 1103 about temperature and gas levels is provided at the bottom of the screen. In some embodiments, data is overlaid directly over the image where it is relevant.

Headphone jack 1104 on the receiver unit 1101 allows the user or users to listen to audio data being transmitted from the sensor unit 101.

The application which displays information on receiver unit 1101 can take several forms. In one embodiment, it is a Java-based Android application program running on an Android tablet or smartphone (as shown in FIG. 11). In some embodiments, it may be an application program on another operating system, such as iOS, Windows, or Blackberry. In some embodiments, it may be a custom application for a different receiver unit. In each case, the application program's three main functions are: a) configuring the communications protocols with one or more sensor units 101, b) processing image and sensor information received from the sensor unit 101, and c) displaying that information in a way that is useful to the end user. In some embodiments, the application has further functions, including triggering/deciding when an image or data point is taken, activating beepers, sirens, or diversionary devices, and controlling the motion of sensor units 101 when these are self-propelled.

Figure 12:
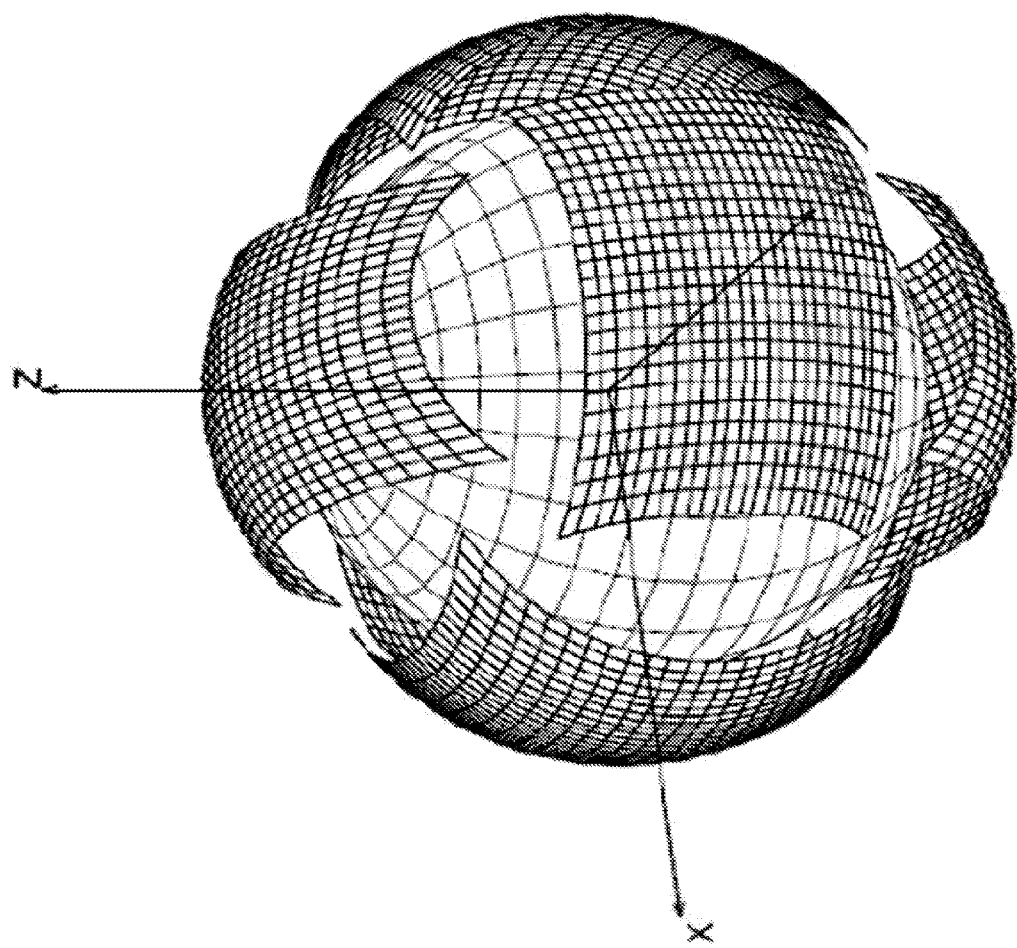
FIG. 12 illustrates a diagram showing a distribution of fish-eye projection having a wide-angle of 100° on a reference sphere in accordance with one embodiment of the disclosed subject matter.
Figure 13:
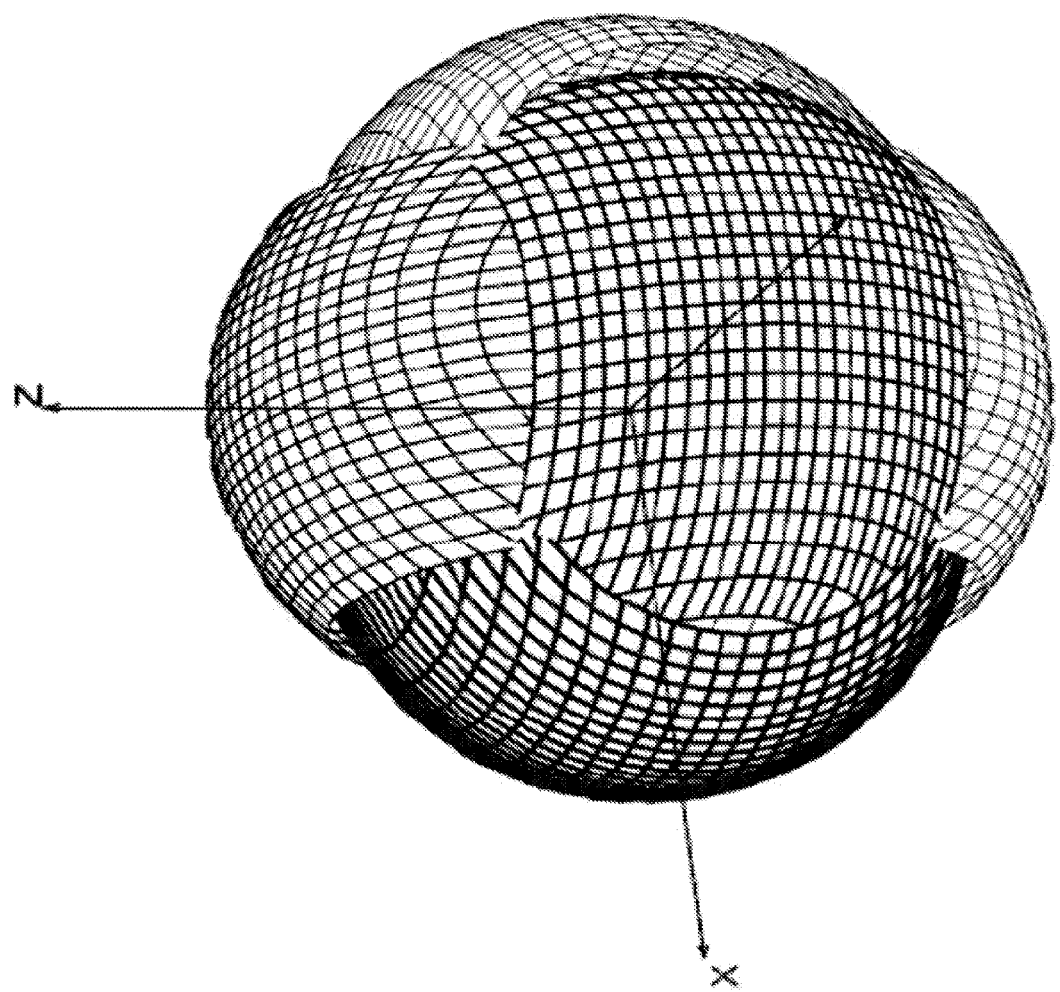
FIG. 13 illustrates a diagram showing an image coverage of a spherical field of view (FOV) with 140° of horizontal field of view (HFOV) and 89° of vertical field of view (VFOV) in accordance with one embodiment of the disclosed subject matter.
Figure 14:
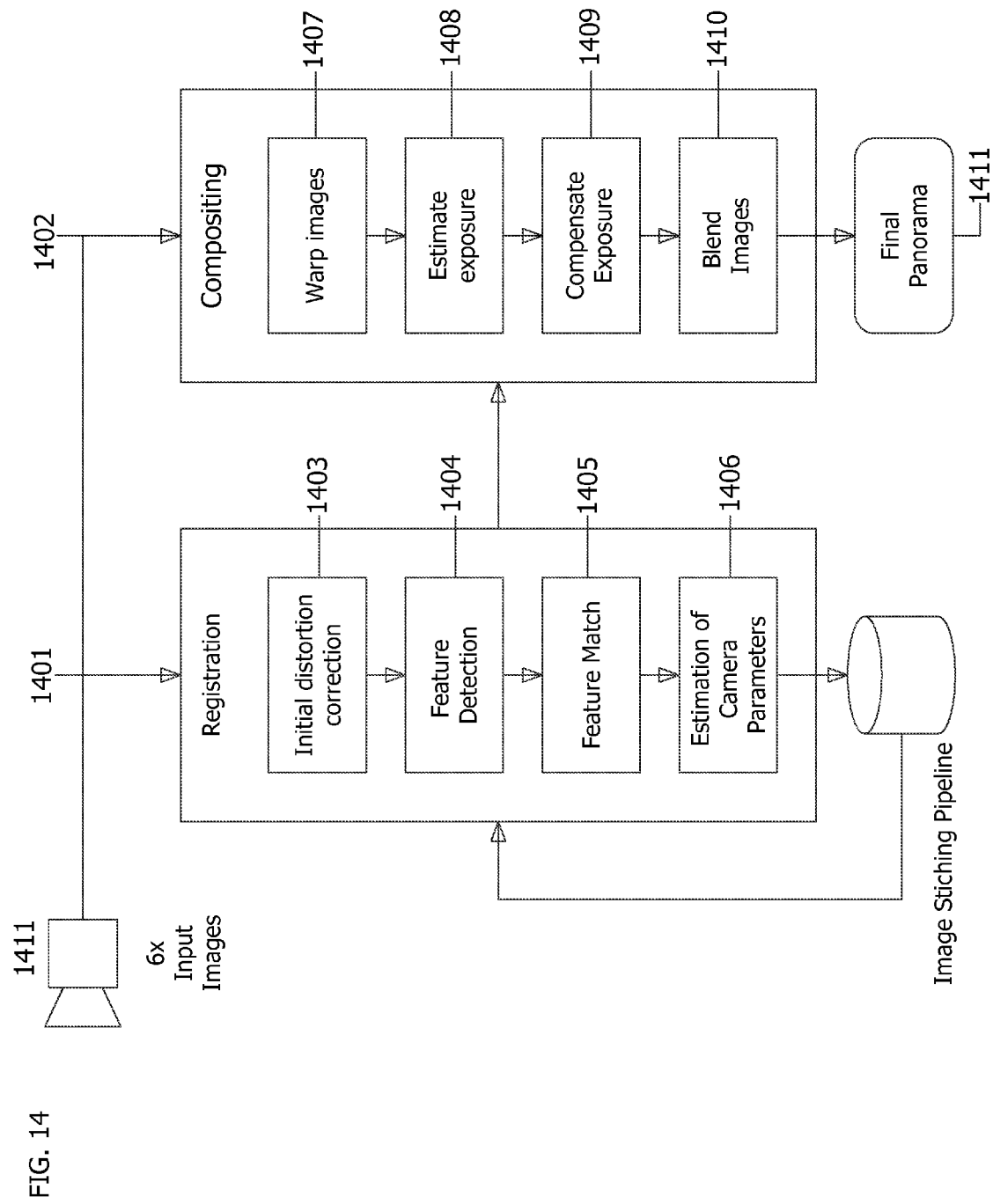
FIG. 14 illustrates a block diagram for processing image data to generate a panoramic image in accordance with one embodiment of the disclosed subject matter.

FIG. 12, FIG. 13, and FIG. 14 illustrate how the application program running on receiver unit 1101 processes and displays the images receiver from sensor unit 101. The creation of a panoramic image with the image data from the sensor unit 101 may, in one embodiment, assume the configuration shown in FIG. 12 of spherically projected images. For clarity, a wide-angle of 100° is shown in this example for the horizontal field of view (HFOV) and a 63° vertical field of view (VFOV), which are lower that the real FOV achieved with wide-angle or fish-eye lenses. It is shown that the image orientations rotate always 90° between neighbors to increase the coverage of the spherical field of view. The aspect ratio shown is the same one as in the image sensor chosen in one embodiment (e.g., 480/752). FIG. 13 shows another sphere coverage example with an HFOV of 140° and a VFOV of 89°.

The spherical projection of each image is computed from the sensor image, and due to the displacement of each image sensor in the physical sphere, the center of the spherical projection is also displaced with respect to the center of the reference sphere, on which the panoramic image is created. The panorama creation follows the processing pipeline depicted in FIG. 14. Once the input images 1411 are received, the panorama creation process is separated in two main steps: Registration 1401 and Compositing 1402.

Registration 1401 begins with initial image distortion correction 1403. In then proceeds to feature detection 1404, which among other things allows for control point matching across neighboring images. Feature match 1405 follows based on feature detection 1404. Next in the process is estimation of image sensor parameters 1406.

Compositing of images 1402 also takes a series of steps. Images are warped 1407 to compensate both for fisheye effects and for how the images are to be displayed on a 2-dimensional screen. The exposure of the image is estimated 1408 and compensated for 1409. The images are then blended 1410 into a single image, which forms the final panorama 1411 displayed to the user on the receiver unit.

The entire process of image capture, registration, composition, and display of a final panorama (and sensor data overlay) takes only a few seconds in the application described above. Such speed can be achieved because of a series of optimizations in the design of the processing software. One of the most important of these optimizations is the assumption, possible given the mechanical design of the sensor unit, that the image sensors are at fixed positions relative to each other. In contrast to other stitching and processing algorithms, which must search the entire images being stitched for matching control points, this application can start from the assumption that control points will only be relevant in areas of field of view overlap dictated by the position of the image sensors and the field of view of the lenses. This simplification massively reduces the computational load required to produce a panoramic image, and as such reduces the lag time so significantly as to provide near-real-time information to the end user.

While prior research has included some mention of creating panoramas from fisheye/wide-angle lens images, these processes assume that images are taken from a single point in space, which is not the case for the image sensors included in the sensor unit as they are displaced from each other on the surface of the sphere. The stitching process therefore corrects mathematically for the elimination of this center point assumption to allow us to create our panoramic images from the multiple image sensors. This occurs at 1406 Estimation of Camera Parameters. Conceptually, instead of a single point of image capture (i.e. a single camera rotated about an axis), as was previously assumed, the image processing starts from the assumption of a virtual universal reference at the center of a projection sphere with each of the imaging sensors displaced from that center. In a sense, the panoramas provided to the user reflect what a user or camera would "see" if occupying that virtual universal reference point. However as the image sensors (and the focal points of their lenses) are not at that center point (given that each is several millimeters from that center at their position on the surface of the receiver unit), the image processing must mathematically correct for that spatial displacement (otherwise the perspective from each of the image sensors would seem to have been shifted relative to a neighboring image sensor's images). This is accomplished by mathematically assigning the position of the image sensor relative to that virtual central reference point.

In some embodiments, multiple images taken at different points in the travel of the sensor unit 101 can allow stereoscopic processing of images, allowing for the creation of three-dimensional representations of a space. In some embodiments, images from multiple sensor units 101 thrown into a space can similar provide stereoscopic perspective, again allowing for three dimensional representations of the space. In some embodiments, the use of several sensors units 101 can allow for effective "mapping" of a space using the communication among sensor units to establish their relative positions (particularly important in search & rescue and fire applications).

In some embodiments, the sensor unit 101 can be deployed as part of a broader system, such as when employed with other sensor units 101 in a mesh network, when deployed along with robots or other remote sensing equipment, or when integrated into a broader communications system employed by first responders or the military (a nation-wide first responder network for such coordination is currently being deployed for this purpose).

Figure 15:
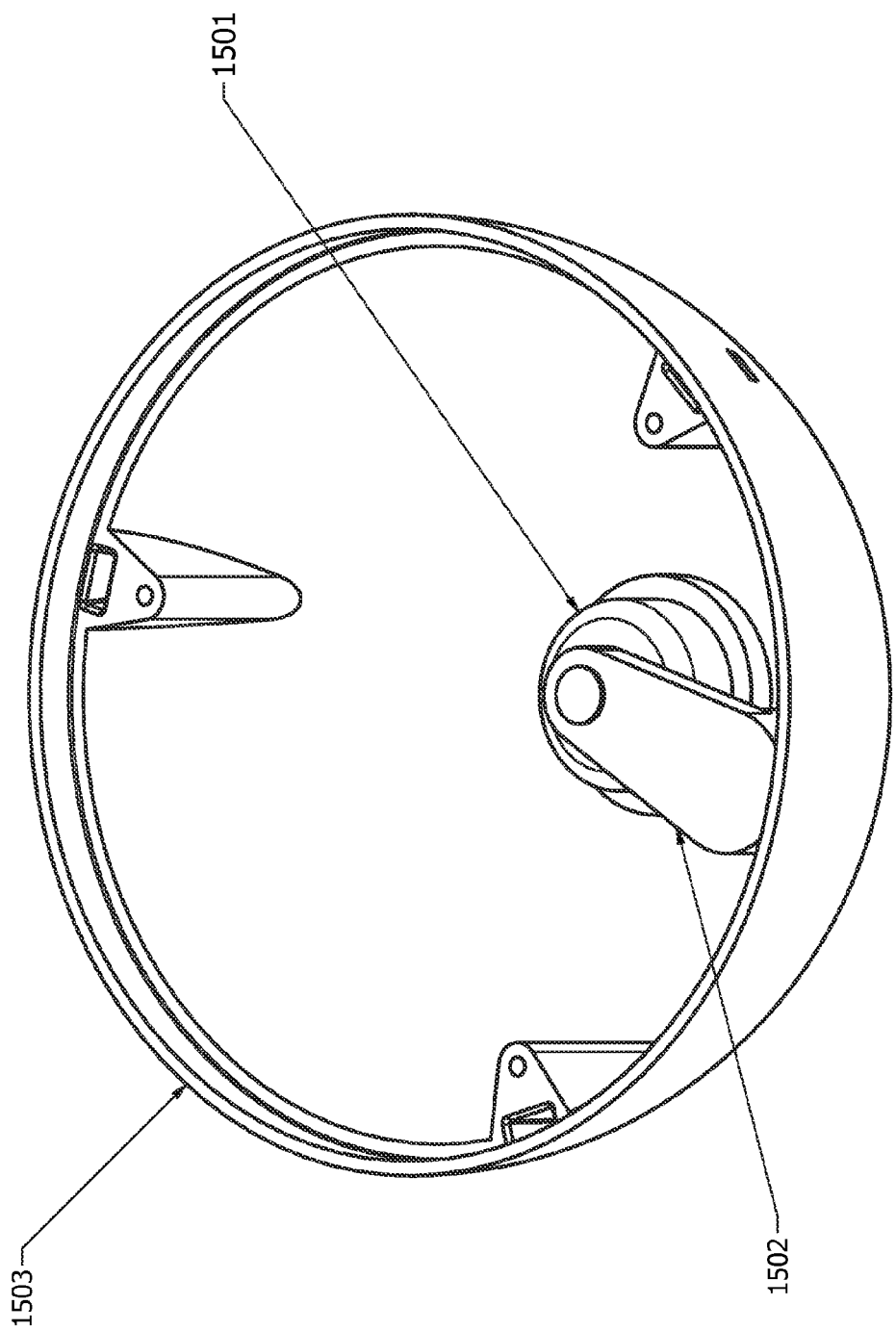
FIG. 15 illustrates a diagram of an internal view of a remote sensor apparatus showing a motor and a counterweight in accordance with one embodiment of the disclosed subject matter.

FIG. 15 illustrates motor 1501 and counter-weight 1502. When activated the motor 1501 turns, changing the position of counter-weight 1502. This shift in the position of counter-weight 1502 changes the center of gravity of the receiver unit 101, one hemisphere 1503 of which is shown in the diagram. This change in center of gravity of the receiver unit causes it to roll or "hop" either randomly in some embodiments or in a more directed fashion (when controlled using data inputs from the IMU 607) in other embodiments.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:

1. In a surveillance system including a plurality of remote sensor apparatus that each is configured for collecting data and a portable receiver for receiving data collected by one or more of the plurality of remote sensor apparatus, wherein the portable receiver includes a radio-frequency identification (RFID) reader and is capable of running an application program for processing the received data and displaying the processed data on a display screen of the portable receiver and wherein the remote sensor apparatus has a housing for containing a processing unit, a plurality of sensors coupled to the processor, an RFID unit and a wireless transceiver, a method for registering one or more of the plurality of remote sensor apparatus with the portable receiver, the method comprising:

reading, at the portable receiver, radio-frequency identification (RFID) stored in the RFID unit of one or more of the plurality of remote sensor apparatus using the RFID reader;

registering, at the portable receiver, the one or more of the plurality of remote sensor apparatus using the received RFID;

receiving, at the portable receiver, first data from a first active remote sensor apparatus, wherein the received first data includes first sensor data collected from at least one of a first plurality of sensors installed in the first active remote sensor and RFID of the first active remote sensor apparatus; and processing, at the portable receiver, the first sensor data received from the first active remote sensor apparatus, if the RFID of the first active remote sensor apparatus matches the RFID of any of the one or more of the plurality of remote sensor apparatus.

2. The method of claim 1, further comprising displaying, at the display screen of the portable receiver, the processed first sensor data.

3. The method of claim 1, further comprising:

receiving, at the portable receiver, second data from a second active remote sensor apparatus, wherein the received second data includes second sensor data collected from at least one of a second plurality of sensors installed in the second active remote sensor and RFID of the second active remote sensor apparatus;

processing, at the portable receiver, the second sensor data received from the second active remote sensor apparatus, if the RFID of the second active remote sensor apparatus matches the RFID of any of the one or more of the plurality of remote sensor apparatus; and displaying, at the display screen of the portable receiver, the processed second sensor data.

4. The method of claim 3, further comprising switching to displaying the processed first sensor data.

5. The method of claim 1, further comprising:

receiving, at the portable receiver, second data from a second active remote sensor apparatus, wherein the received second data includes second sensor data collected from at least one of a second plurality of sensors installed in the second active remote sensor and RFID of the second active remote sensor apparatus;

processing, at the portable receiver, the second sensor data received from the second active remote sensor apparatus, if the RFID of the second active remote sensor apparatus matches the RFID of any of the one or more of the plurality of remote sensor apparatus; and displaying simultaneously, at the display screen of the portable receiver, the processed first sensor data and the processed second sensor data.

6. The method of claim 4, wherein at least a part of the processed first sensor data is overlaid on at least a part of the processed second sensor data.

7. The method of claim 4, wherein each of the processed first sensor data and the processed second sensor data is displayed in a separate window or a separate sub-window.

8. In a surveillance system including a plurality of remote sensor apparatus that each is configured for collecting data and a portable receiver for receiving data collected by one or more of the plurality of remote sensor apparatus, wherein the portable receiver includes a digital camera and is capable of running an application program for processing the received data and displaying the processed data on a display screen of the portable receiver and wherein the remote sensor apparatus has a housing for containing a processing unit, a plurality of sensors coupled to the processor and a wireless transceiver, a method for registering one or more of the plurality of remote sensor apparatus with the portable receiver, the method comprising:

capturing, at the portable receiver, images including identification (ID) codes associated with one or more of the plurality of remote sensor apparatus using the digital camera;

decoding, at the portable receiver, the ID codes from the captured images using the application program;

registering, at the portable receiver, the one or more of the plurality of remote sensor apparatus using the ID code;

receiving, at the portable receiver, first data from a first active remote sensor apparatus, wherein the received first data includes first sensor data collected from at least one of a first plurality of sensors installed in the first active remote sensor and ID code of the first active remote sensor apparatus; and processing, at the portable receiver, the first sensor data received from the first active remote sensor apparatus, if the ID code of the first active remote sensor apparatus matches the ID code of any of the one or more of the plurality of remote sensor apparatus.

9. In a surveillance system including a plurality of remote sensor apparatus that each is configured for collecting data and a portable receiver for receiving data collected by one or more of the plurality of remote sensor apparatus, wherein the portable receiver includes a keyboard for receiving user inputs and is capable of running an application program for processing the received data and displaying the processed data on a display screen of the portable receiver and wherein the remote sensor apparatus has a housing for containing a processing unit, a plurality of sensors coupled to the processor and a wireless transceiver, a method for registering one or more of the plurality of remote sensor apparatus with the portable receiver, the method comprising:

receiving, at the portable receiver, identification (ID) codes of one or more of the plurality of remote sensor apparatus using the keyboard;

registering, at the portable receiver, the one or more of the plurality of remote sensor apparatus using the received ID codes;

receiving, at the portable receiver, first data from a first active remote sensor apparatus, wherein the received first data includes first sensor data collected from at least one of a first plurality of sensors installed in the first active remote sensor and ID code of the first active remote sensor apparatus; and processing, at the portable receiver, the first sensor data received from the first active remote sensor apparatus, if the ID code of the first active remote sensor apparatus matches the ID code of any of the one or more of the plurality of remote sensor apparatus.

\* \* \* \* \*